(12) United States Patent
Funahata et al.

(10) Patent No.: US 7,277,143 B2
(45) Date of Patent: Oct. 2, 2007

(54) TRANSLUCENT REFLECTIVE TYPE LIQUID CRYSTAL DISPLAY

(75) Inventors: Katsuyuki Funahata, Hitachi (JP); Makoto Abe, Sendai (JP); Osamu Itoh, Hitachi (JP); Shinichi Komura, Hitachi (JP)

(73) Assignee: Hitachi Displays, Ltd., Mobara-shi (JP)

( * ) Notice: Subject to any disclaimer, the term of this patent is extended or adjusted under 35 U.S.C. 154(b) by 87 days.

(21) Appl. No.: 10/522,772

(22) PCT Filed: Sep. 20, 2002

(86) PCT No.: PCT/JP02/09691

§ 371 (c)(1),
(2), (4) Date: Jan. 31, 2005

(87) PCT Pub. No.: WO2004/027497

PCT Pub. Date: Apr. 1, 2004

(65) Prior Publication Data

US 2005/0264728 A1 Dec. 1, 2005

(51) Int. Cl.
*G02F 1/1335* (2006.01)
(52) U.S. Cl. ........................ 349/114; 349/113
(58) Field of Classification Search ............. 349/114, 349/113
See application file for complete search history.

(56) References Cited

U.S. PATENT DOCUMENTS 7,053,969 B2 * 5/2006 Yamazaki et al. ............ 349/43

FOREIGN PATENT DOCUMENTS

| JP | 2000-14211 | 1/2000 |
|---|---|---|
| JP | 2000-284305 | 10/2000 |
| JP | 2001-242452 | 9/2001 |
| JP | 2002-162623 | 6/2002 |
| WO | WO 2004/027497 A1 | 4/2004 |

OTHER PUBLICATIONS

"Vivid Color Image On A Small-Size Liquid Crystal Panel Comparable to the PC Monitor", pp. 1-3.

* cited by examiner

*Primary Examiner*—David Nelms
*Assistant Examiner*—David Chung
(74) *Attorney, Agent, or Firm*—Antonelli, Terry, Stout & Kraus, LLP.

(57) ABSTRACT

A low cost transflective type liquid crystal display is provided which can display a bright image with high contrast under both indoor and outdoor illumination environments. The liquid crystal display performing transmission type display and reflection type display, includes: a plurality of pixels surrounded on a substrate 10 by a plurality of gate electrodes 11 and a plurality of source electrodes 15 arranged perpendicularly to the gate electrodes; a switching element 19 arranged in each pixel and disposed neat at the intersection between each gate electrode and each source electrode; and a pixel electrode 16 connected to the switching element, wherein the pixel electrode is constituted of a transparent conductive layer and a conductive member 17 having a light reflection function and electrically connected to the transparent conductive layer.

10 Claims, 12 Drawing Sheets

(a)

(b)

TRANSLUCENT REFLECTIVE TYPE LIQUID CRYSTAL DISPLAY

TECHNICAL FIELD

The present invention relates to a liquid crystal display having a function effective for a transflective type. More particularly, the present invention relates to a liquid crystal display having a function effective for a transflective type.

BACKGROUND ART

A conventional transflective type color liquid crystal display is disclosed, for example, in JP-A-2000-14211. This document describes a liquid crystal display having a liquid crystal device mounted with a reflection plate which has a convex/concave surface shape and whose concave portions are disposed by using the Fibonacci sequence to disappear the regularity of the convex/concave shapes.

As described in the News Release (2002. 3. 12) of Matsushita Electric Industrial Co., Ltd., a transflective type color liquid crystal display has been proposed in which a reflection film is formed only on an optimum slope surface of a convex/concave portion formed on a thin film transistor (hereinafter called a TFT), the other area is used as a transmission portion to improve a light use efficiency, and the Fibonacci sequence is applied to the design of the convex/concave portion of a reflection plate to allow a high white color image in reflection display.

A conventional transflective type color liquid crystal display is described in JP-A-2000-284305, which display has a display electrode constituted of a lower conductive layer made of stacked particles and an upper metal layer formed on the lower layer.

DISCLOSURE OF THE INVENTION

The transflective color liquid crystal display according to these conventional technologies has an improved light use efficiency by forming a reflection film only on an optimum slope surface of a convex/concave portion made of resin or the like and formed on TFT, and the other area is used as a transmission portion.

However, these conventional technologies are associated with some problems. Since the reflection film is formed only on the optimum slope surface of the convex/concave portion, the cost rises because an additional photo mask and an additional patterning process are used for forming the reflection film only in this particular area, and moreover the aperture factor of the transmission portion and the reflection characteristics change with a position alignment precision of the photo mask and the convex/concave portion pattern.

These conventional technologies are also associated with another problem. Since the reflection film is formed only on the optimum slope surface (particular area) of the convex/concave portion, the reflection film cannot be used as the pixel electrode and another transparent pixel electrode is required. The cost rises therefore because of the complicated structure and manufacture processes.

An object of the present invention is to provide a liquid crystal display having a transflective plate with better transmission and reflection characteristics.

According to one aspect of the present application, there is provided a transflective type liquid crystal display performing transmission type display and reflection type display and including: a plurality of pixels surrounded on a substrate by a plurality of gate electrodes and a plurality of source electrodes arranged orthogonally to the gate electrodes; a switching element arranged in each pixel and disposed near at an intersection between each gate electrode and each source electrode; and a pixel electrode connected to the switching element, wherein the pixel electrode is comprised of a transparent conductive layer and conductive members having a light reflection function and electrically connected to the transparent conductive layer.

With this pixel electrode structure, an electrode for both the transmission/reflection displays having a simplest structure can be formed and the conductive members themselves can be used as a light reflection electrode. It is therefore possible to control an area ratio of the transmission display portion to the reflection display portion at high precision and as desired. This structure can provide a transflective liquid crystal display which can perform transmission display/ reflection display suitable for illumination conditions both in indoor and outdoor environments.

If the simplest electrode for both transmission/reflection displays is used which is made of the transparent conductive layer and the conductive members having the light reflection function, the intensity of transmitted or reflected light cannot be attenuated both in transmission/reflection displays. Therefore, the present invention can provide a transflective liquid crystal display which can display a bright and high contrast image both in indoor and outdoor environments.

If the structure is used in which fine conductive members as the reflection display electrode are directly formed on the transparent conductive layer, the conductive members can be disposed randomly at desired positions. Therefore, the present invention can provide a transflective liquid crystal display which can display a bright and high contrast image both in indoor and outdoor environments.

If the structure is used in which fine conductive members as the reflection display electrode are directly formed on the transparent conductive layer, the shapes and sizes of the conductive members can be controlled easily and the optical thicknesses of the transmission display portion and reflection display portion can be set easily. It is therefore possible to provide a transflective liquid crystal display which can display a bright and high contrast image both in indoor and outdoor environments.

If the simplest electrode for both transmission/reflection displays is used which is made of only the transparent conductive layer and the conductive members having the light reflection function, the number of manufacture processes can be reduced considerably. Therefore, the present invention can provide a transflective liquid crystal display which is inexpensive and can display a bright and high contrast image both in indoor and outdoor environments.

If the pixel electrode structure is used which is formed by disposing a plurality of fine convex or concave conductive members as the reflection display portion on the conductive layer as the pixel electrode, it is possible to provide a transflective liquid crystal display whose area ratio of the transmission display portion to the reflection display portion can be controlled at high precision and as desired.

Further, if the fine convex or concave portions as the reflection display portion formed on the conductive layer as the pixel electrode have continuously changing slope surfaces, it is possible to provide a transflective liquid crystal display which can perform reflection and transmission displays independent of an observation angle.

Furthermore, if the fine convex or concave portions as the reflection portion formed on the conductive layer as the pixel electrode are made to have generally a circle, string or bar shape, it is possible to provide a transflective liquid crystal display which can perform bright reflection transmission displays without coloring.

Further, if the fine convex or concave portions as the reflection portion formed on the conductive layer as the pixel electrode are made to have generally a circle, string or bar shape and disposed in a phase separation pattern realized by high polymer block copolymer or the like, it is possible to provide a transflective liquid crystal display which can perform bright reflection transmission displays without coloring.

Still further, if the conductive members as the light diffusion reflection elements formed on the conductive layer as the pixel electrode are made of material mainly consisting of fine particles such as silver, aluminum and gold having a micron order or nano order diameter, it is possible to provide a transflective liquid crystal display which can perform bright reflection transmission displays without coloring and can be formed at a low temperature.

According to another aspect of the present application, there is provided a transflective type liquid crystal display performing transmission type display and reflection type display in each pixel, wherein a pixel electrode disposed in each pixel is comprised of a transparent conductive layer and conductive members having a light reflection function and electrically connected to the transparent conductive layer.

BEST MODE FOR CARRYING OUT THE INVENTION

Figure 1:
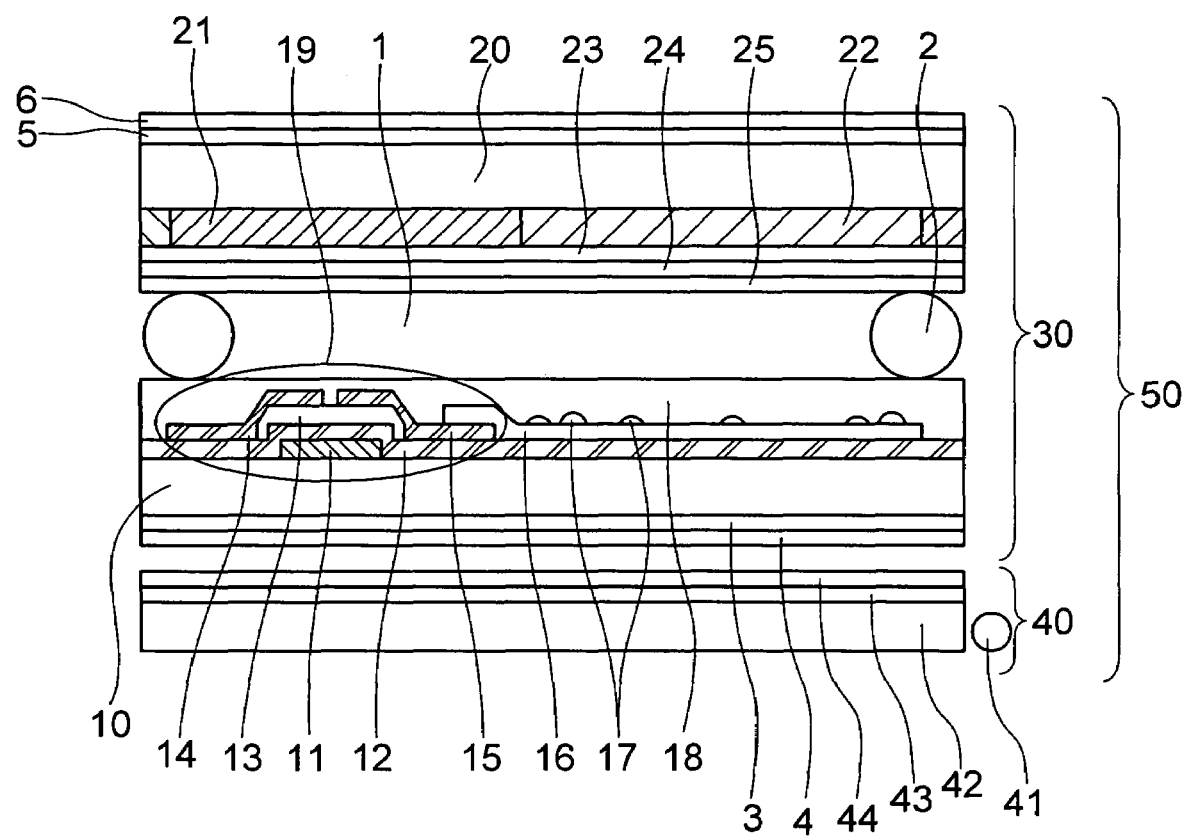
FIG. 1 is a diagram showing the cross sectional structure of a transflective type liquid crystal display of an active drive type according to an embodiment of the present invention.

The outline of the present invention will be described with reference to FIG. 1. The present invention provides a transflective type liquid crystal display performing transmission type display and reflection type display and including: a plurality of pixels surrounded on a substrate by a plurality of gate electrodes 11 and a plurality of source electrodes 15 arranged perpendicularly to the gate electrodes 11; a switching element 19 (e.g., TFT) arranged in each pixel and disposed near at the intersection between each gate electrode 11 and each source electrode 15; and a pixel electrode 16 connected to the switching element, wherein the pixel electrode 16 is constituted of a transparent conductive layer and a conductive member 17 having a light reflection function and electrically connected to the transparent conductive layer.

An example of specific element structures will be described in the following. First, the element structures of an active type color liquid crystal display will be described in detail.

Formed on a glass substrate (active matrix substrate 42) are TFTs (a gate electrode (material: chromium, film thickness: 100 to 300 nm, preferably 150 nm), a gate insulating film (material: silicon nitride, film thickness: 200 to 700 nm, preferably 350 nm), an amorphous silicon layer (material: amorphous silicon, film thickness: 50 to 300 nm, preferably 200 nm), an amorphous silicon layer doped with n-type impurities and phosphorus (material: amorphous silicon, film thickness: 10 to 100 nm, preferably 20 nm), a drain electrode (material: chromium, film thickness: 100 to 300 nm, preferably 150 nm), a source electrode (material: chromium, film thickness: 100 to 300 nm, preferably 150 nm), a drain electrode (material: chromium, film thickness: 100 to 300 nm, preferably 150 nm) and a transparent electrode (material: ITO, film thickness: 100 to 300 nm, preferably 150 nm)). Directly formed on the transparent electrode are electrically connected fine convex or concave conductive members (if a circular shape, diameter: 3 to 15 µm, height (or depth): 0.2 to 1 µm). The convex or concave conductive members are made of a conductive material (metal material: silver, gold or aluminum, dust diameter: 1 to 10 µm, preferably 3 to 5 µm, particle diameter: 1 to 20 nm, preferably 3 to 10 nm, binder: thermosetting resin, solvent: nonpolar solvent such as toluene and dodecane, viscosity: 1 to 10000 mPa·s, preferably 5 to 100 mPa·s, surface tension: 50 dyn/cm or smaller, preferably 25 dyn/cm or smaller, curing temperature: 150 to 250° C., preferably 180 to 220° C., resistivity: 1 to 1000 Ω/cm, preferably 5 to 500 Ω/cm), the conductive member having a continuously changing inclination angle for condensing incident light along a particular direction and a reflection function. An orientation control film (material: polyimide resin, film thickness: 100 to 300 nm, preferably 150 nm) is formed above TFTs, pixel electrodes and convex or concave conductive members. In this manner, one electrode substrate is formed. Another substrate is formed by forming on a glass substrate a light shielding layer (material: chromium and chromium oxide, film thickness: 100 to 300 nm, preferably 200 nm), forming on the light shielding film a coloring layer (base material: acrylic resin, dispersant: pigment, film thickness: 1000 to 3000 nm, preferably 1500 nm), forming on the coloring layer a planarizing layer (material: acrylic resin, film thickness: 1000 to 3000 nm, preferably 2000 nm), forming on the planarizing layer a transparent electrode (material: ITO (Indium Tin Oxide), film thickness: 100 to 300 nm, preferably 150 nm), and by forming on the transparent electrode an orientation control film (material: polyimide resin, film thickness: 100 to 300 nm, preferably 200 nm). The two electrode substrates are combined via spacer members (polymer beads, silica beads, glass fiber, particle diameter: 5 µm), with both the orientation control film surfaces being faced each other. The peripheral areas of both the electrode substrates are bonded together by sealing material (epoxy resin dispersed with the spacer member) and sealed. Liquid crystal is filled in the space between the electrode substrates and hermetically sealed to thereby form a liquid crystal display device.

A predetermined phase difference plate and a predetermined polarizing plate are adhered to the glass substrates of the liquid crystal device. A tape carrier package (hereinafter called a TCP) mounted with a liquid crystal driver IC, and a driver external circuit and the like are connected to the liquid crystal display device. The liquid crystal display device and a back light are assembled in a housing such as a metal frame and a resin case to form a liquid crystal display, the back light being comprised of a light source (cold cathode tube, LED or the like), a light guiding member, a prism sheet, a diffusion sheet and the like.

In the present invention, the pixel electrode is formed by disposing the conductive member having the reflection function on the transparent conductive layer. The conductive member is made of fine convex or concave conductive members directly disposed on the conductive layer without involving any insulating layer. Therefore, the transparent conductive layer as a transmission display portion and the conductive member as a reflection display portion are electrically connected and they can be used as the common electrode both for the transmission/reflection displays. Furthermore, the fine convex or concave conductive members themselves are the diffusion reflection elements and become a reflection display portion and the other area is a transmission display portion. Therefore, the area ratio of the transmission display portion to the reflection display portion in each pixel can be controlled as desired. A transflective type liquid crystal display can be provided which can display a bright and high contrast image irrespective of indoor and outdoor environments.

First Embodiment

FIGS. 1 to 5 show a transflective liquid crystal display having transflective electrodes each constituted of convex or concave conductive members having a reflection function disposed at a desired density on each pixel electrode made of a transparent conductive layer.

First, the cross sectional structure of the transflective liquid crystal display of the present invention will be described.

As shown in FIG. 1, a plurality of TFT's 19 are disposed on a glass substrate 10 by vacuum vapor deposition and photolithography. TFT 19 is constituted of a gate electrode 11 (material: chromium, film thickness: 100 to 300 nm, preferably 150 nm), a gate insulating film 12 (material: silicon nitride, film thickness: 50 to 300 nm, preferably 200 nm), an amorphous silicon layer 13 doped with n-type impurities and phosphorus (material: amorphous silicon, film thickness: 10 to 100 nm, preferably 20 nm), a drain electrode 14 (material: chromium, film thickness: 100 to 300 nm, preferably 150 nm), and a source electrode 15 (material: chromium, film thickness: 100 to 300 nm, preferably 150 nm).

A transparent conductive layer 16 (material: ITO (Indium Tin Oxide), film thickness: 100 to 300 nm, preferably 150 nm is formed electrically connected to TFT 19. Formed on the conductive layer 16 are conductive members 17 (silver nano paste manufactured by Harima Chemicals, Inc., type: NPS-J) mainly made of silver dusts and silver particles (material: silver, silver dust diameter: 1 to 10 µm, preferably 3 to 5 µm, silver particle diameter: 1 to 20 nm, preferably 3 to 10 nm, binder: thermosetting resin, solvent: nonpolar solvent such as toluene and dodecane, viscosity: 1 to 10000 mPa·s, preferably 5 to 100 mPa·s, surface tension: 50 dyn/cm, preferably 25 dyn/cm, curing temperature: 150 to 250° C., preferably 180 to 220° C., resistivity: 1 to 50 µΩ·cm (film thickness: 0.01 to 100 µm), preferably 5 to 30 µΩ·cm).

The conductive member 17 is formed by disposing a plurality of electrically connected fine convex or concave conductive members (shape: circle (diameter: 3 to 15 µm, height (or depth): 0.2 to 1 µm), polygon, bar or string) directly on the conductive layer without involving any insulating layer, by an ink jet method or an offset print method, to thereby form a transflective pixel electrode.

An orientation control film 18 (material: polyimide resin, coating method: spin coating, film thickness: 100 to 300 nm, preferably 150 nm) is formed above pixel electrodes to thereby form one electrode substrate.

Another substrate is formed by forming on a glass substrate 20 a light shielding layer 21 (material: chromium and chromium oxide, film thickness: 100 to 300 nm, preferably 200 nm), a coloring layer 22 (base material: acrylic resin, dispersant: pigment, coating method: spin coating, film thickness: 1000 to 3000 nm, preferably 1500 nm), a protective layer 23 (material: acrylic resin, film thickness: 1000 to 3000 nm, preferably 2000 nm), a transparent electrode 24 (material: ITO (Indium Tin Oxide), film thickness: 100 to 300 nm, preferably 150 nm), and an orientation control film 25 (material: polyimide resin, coating method: spin coating, film thickness: 100 to 300 nm, preferably 200 nm).

The two electrode substrates are combined via spacer members 2 (material: polymer beads, silica beads, glass fiber, particle diameter: 5 µm, dispersing method: water dispersion), with both the orientation control film surfaces being faced each other. The peripheral areas of both the electrode substrates 10 and 20 are bonded together by sealing material (not shown: material: epoxy resin, dispersant: spacer particles) and sealed. Liquid crystal is filled in the space between the electrode substrates 10 and 20 to thereby form a liquid crystal display device.

A predetermined phase difference plate 3, 5 and a predetermined polarizing plate 4, 6 are adhered to the glass substrates of the liquid crystal device. A TCP mounted with a liquid crystal driver IC, and a driver external circuit and the like are connected to the transflective type liquid crystal display device 30. The liquid crystal display device 30 and a back light 40 are assembled in a housing such as a frame and a case to form a transflective type liquid crystal display, the back light being constituted of a light source 41 (cold cathode tube, LED), a light guiding member 42 (material: acrylic), a prism sheet 43, a diffusion sheet 44 and the like. In this manner, a transflective type liquid crystal display 50 if formed.

Figure 2:
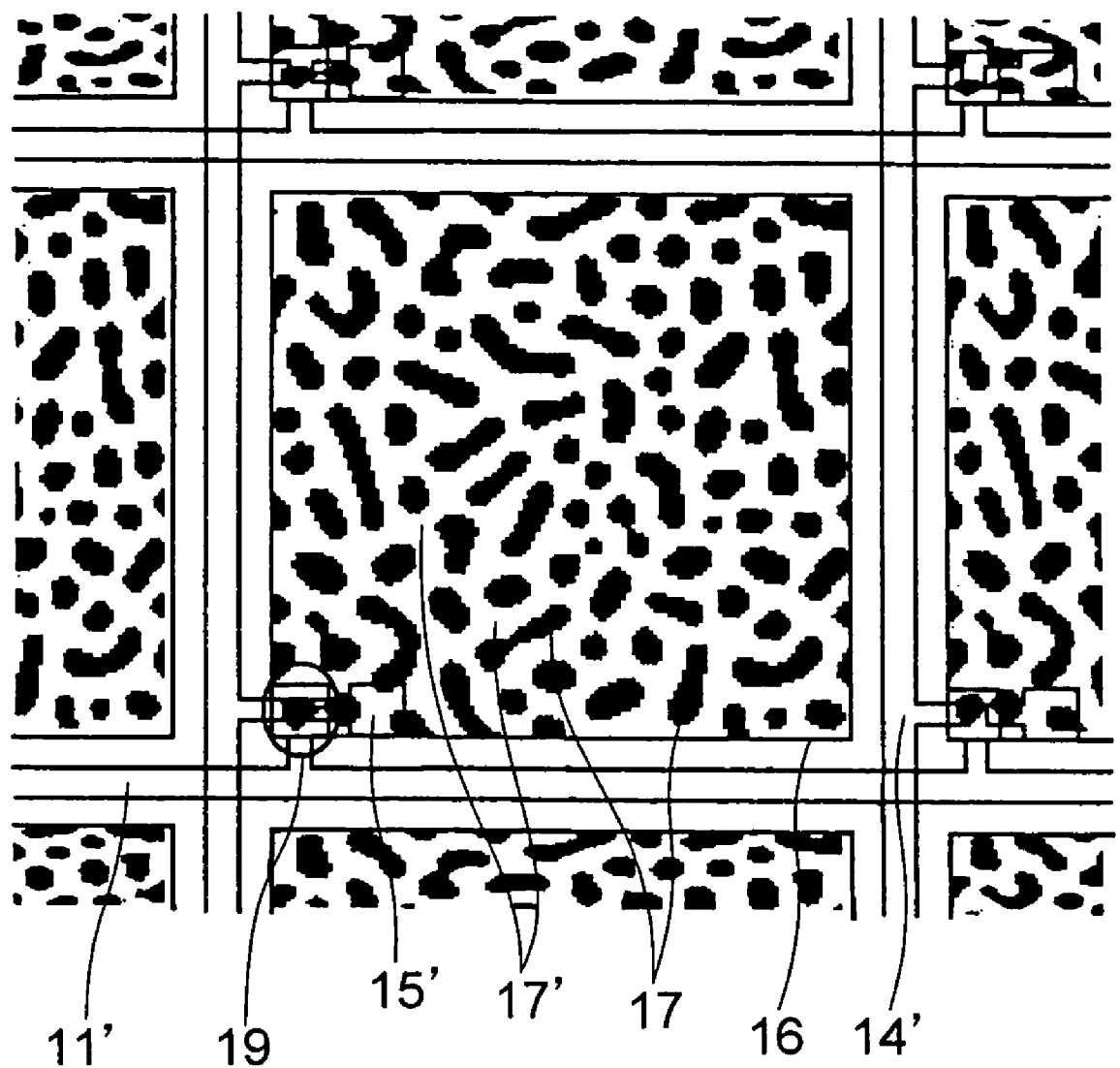
FIG. 2 is a diagram showing the details of a pixel electrode portion of the transflective type liquid crystal display of an active type according to the embodiment of the present invention.

FIG. 2 shows the details of a pixel electrode portion characteristic to the present invention.

As shown in FIG. 2, the pixel electrode is formed by disposing the conductive members 17 having the reflection function on the transparent conductive layer 16 connected to the source electrode of the thin film transistor 19 formed in an area surrounded by the gate electrode 11' and drain electrode 14'. The black areas correspond to a reflection display portion and the white areas correspond to a transmission display portion.

The layout pattern of the conductive members 17 utilizes a phase separation pattern realized by high polymer block copolymer or the like. The present invention is not limited to this shape and pattern. The shape may be a circle, a polygon or a string. The layout pattern may be formed by using random numbers or the Fibonacci sequence. Since the ratio of the reflection display area to the pixel area is desired to be controlled as desired, in this embodiment the phase separation pattern realized by high polymer block copolymer and the like is used.

Figure 3:
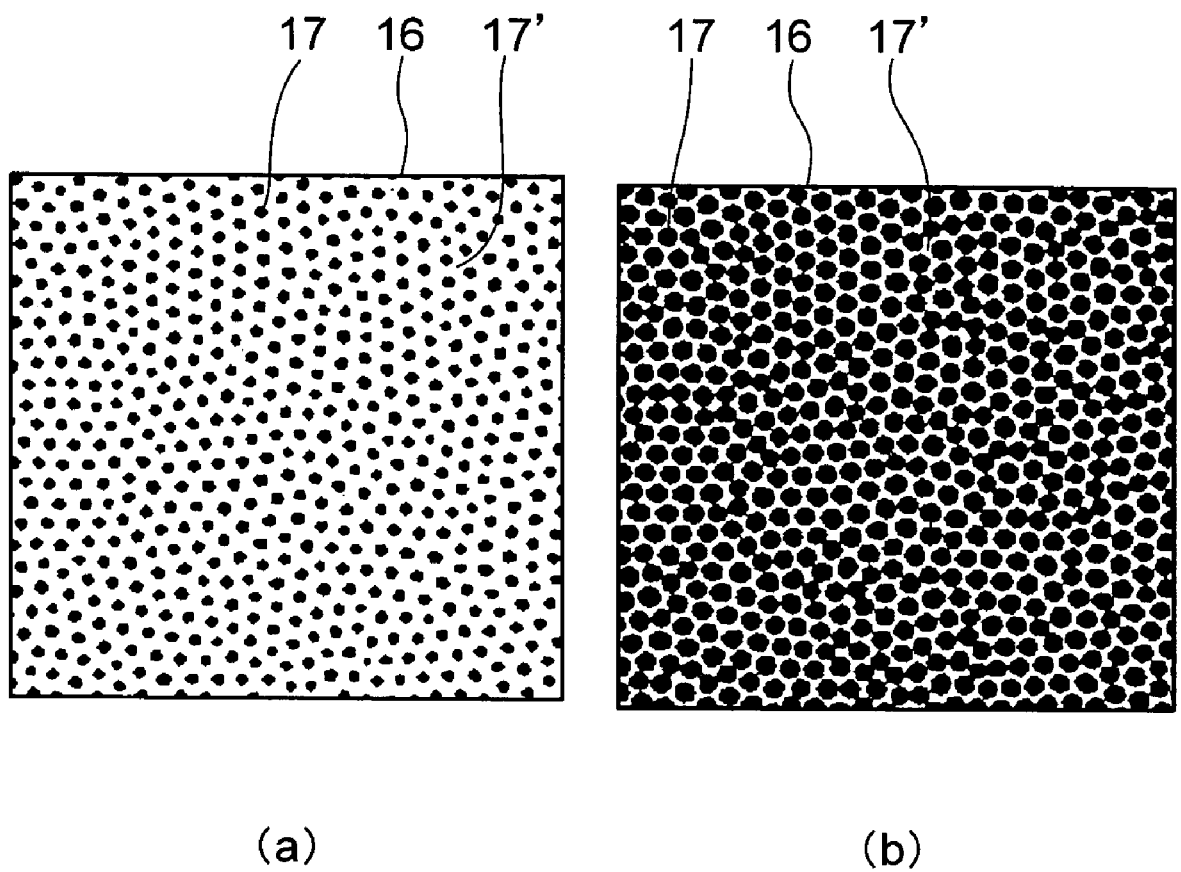
FIG. 3 is a diagram showing a layout pattern of light diffusion reflection elements made of a conductive material having a reflection function according to the present invention.
Figure 4:
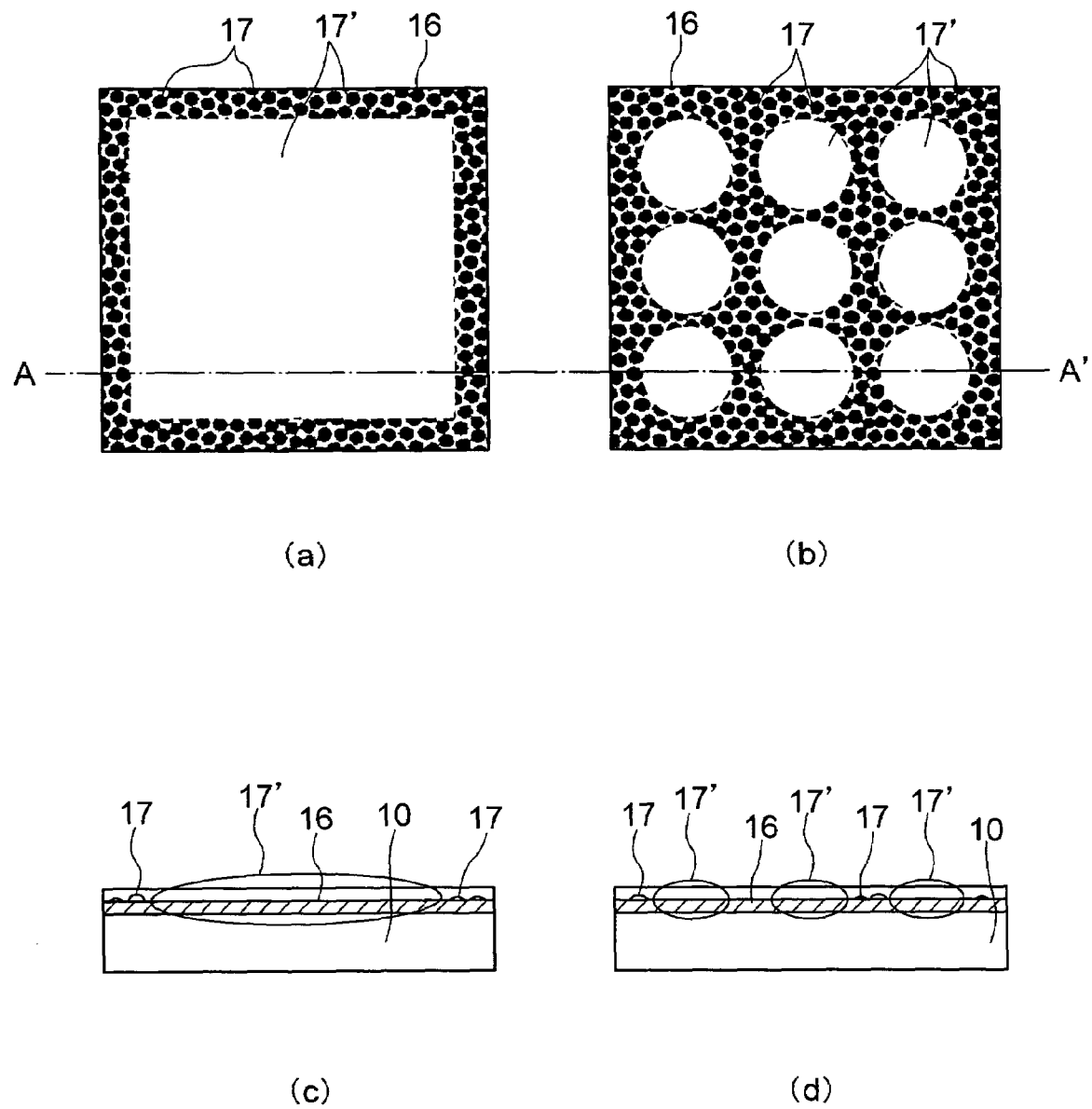
FIG. 4 is a diagram showing another layout pattern of the light diffusion reflection elements made of the conductive material having the reflection function according to the present invention.
Figure 5:
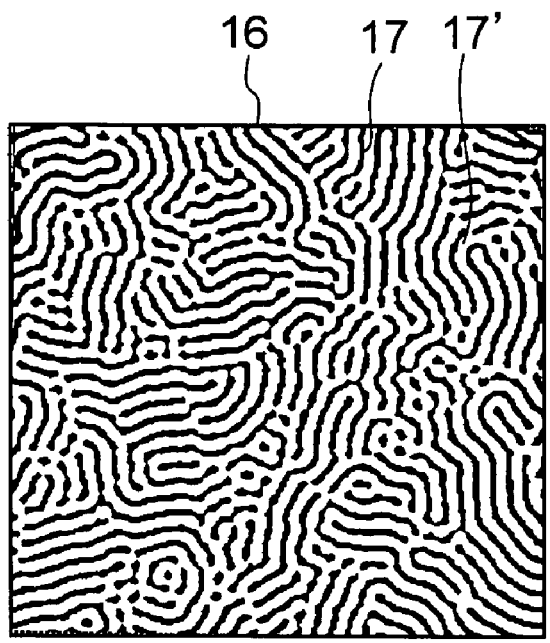
FIG. 5 is a diagram showing still another layout pattern of the light diffusion reflection elements made of the conductive material having the reflection function according to the present invention.
Figure 5:
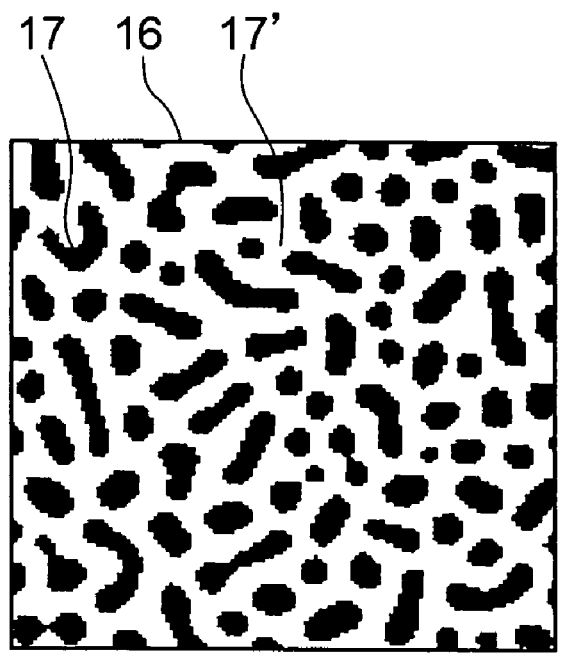

FIGS. 3 to 5 show examples of the layout of the conductive members having a reflection function specific to the present invention.

In FIG. 3, conductive members are disposed in the whole pixel area. (a) shows the pattern with transmission display priority, and (b) shows the pattern with reflection display priority. As shown, generally circular convex or concave conductive members 17 are dispersively disposed in the whole area of the transparent conductive layer 16. A transmission display area 17' (drawn in white) is larger than a reflection display area 17 (drawn in black) in (a), showing an example of the layout pattern of so-called transmission display priority. The transmission display area 17' (drawn in white) is smaller than the reflection display area 17 (drawn in black) in (a), showing an example of the layout pattern of so-called reflection display priority.

In FIG. 4, the convex or concave conductive members are disposed only in a particular area. (a) shows an integral transmission display area, and (b) shows divided transmission display areas. (c) is a cross sectional view of (a), and (d) is a cross sectional view of (b). As shown in (a) and (c), the conductive members 17 are disposed only in a peripheral area of the transparent electrode 16. This layout pattern of so-called transmission display priority has a large integral transmission display area 17' (drawn in white) and a very small reflection display area 17 (drawn in black). As shown in (b) and (d), a plurality of relatively large transmission display areas are disposed on the transparent electrode 16, and the conductive members 17 are disposed in the other area. This layout pattern of so-called transmission display priority has a plurality of transmission display areas 17' (drawn in white) and a small reflection display area 17 (drawn in black). In this embodiment, although the conductive members are not disposed in the relatively large transmission display area, the embodiment is not limited thereto, but the conductive members may be disposed in this transmission display area.

FIG. 5 shows another layout pattern of the conductive members. (a) shows strings and (b) shows bars. As shown in (a), the convex or concave conductive members 17 are disposed in an elongate string shape, and this layout pattern has a transmission display area (drawn in white) approximately equal to a reflection display area (drawn in black). As shown in (b), the convex or concave conductive members 17 are disposed in a bar shape, and this layout pattern has a transmission display area (drawn in white) approximately equal to a reflection display area (drawn in black). The characteristics of the layout pattern of this string or bar conductive members 17 reside in that the reflection characteristics can be provided with a directivity (azimuth).

Figure 6:
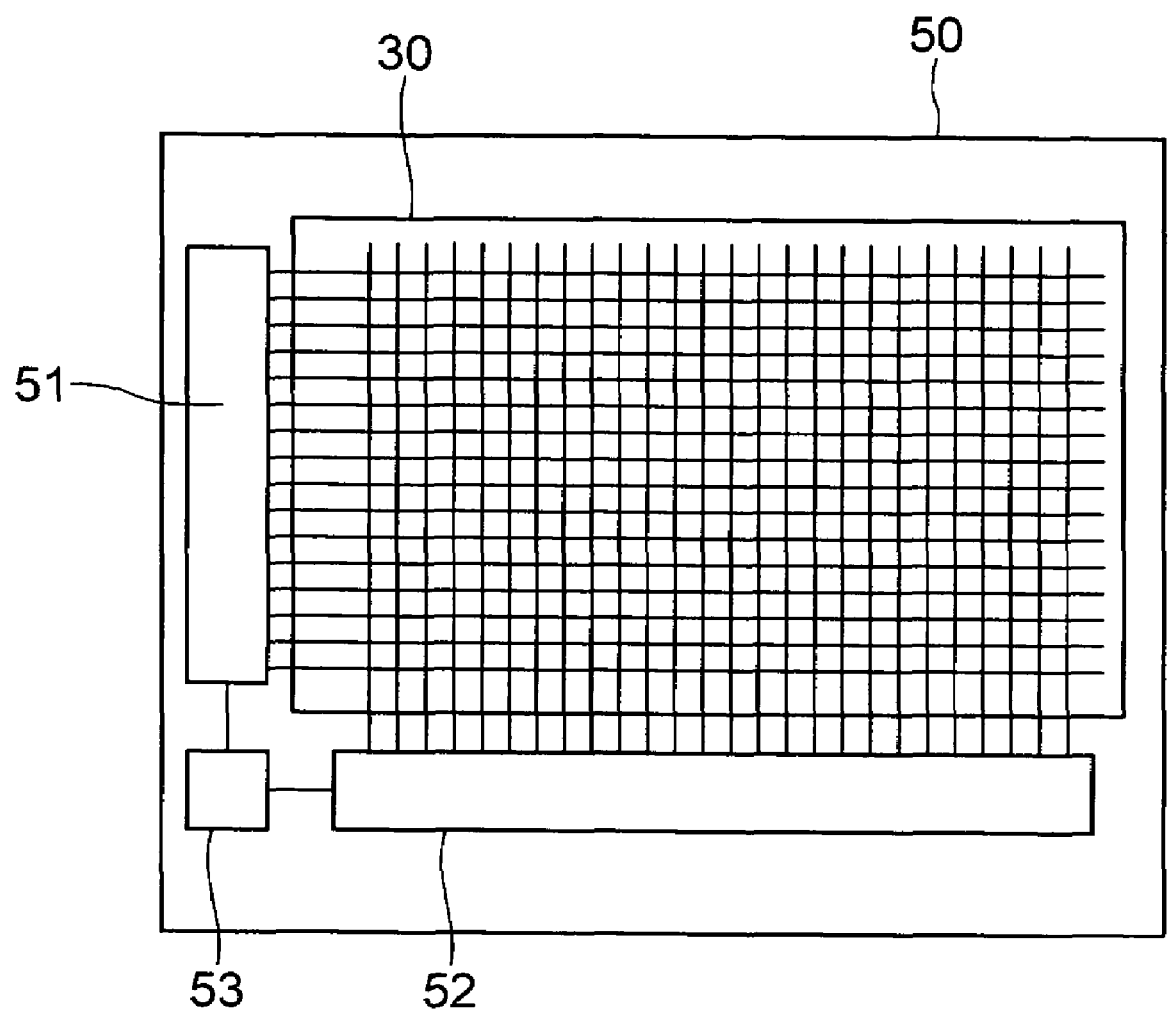
FIG. 6 is a schematic diagram showing the structure of the transflective type liquid crystal display of the active drive type according to the embodiment of the present invention.

FIG. 6 is a schematic diagram showing the structure of a transflective type liquid crystal display of the present invention.

As shown, a transflective type liquid crystal display 50 of the present invention is constituted of a transflective type liquid crystal display device 30, a scan side driver circuit 51, a signal side drive circuit 52 and a signal processing circuit 53. Although not shown, the back light constituted of a cold cathode tube, a light guiding member, a prism sheet and a diffusion sheet is mounted on the back of the transflective type liquid crystal display device 30.

According to the present invention, the fine convex or concave conductive members as the light diffusion reflection elements having the reflection function are disposed randomly. It is therefore possible to control as desired the ratio of the total area of the convex or concave members occupying the pixel area. Accordingly a transflective type liquid crystal display can display a bright and high contrast image without coloring by interference, both in indoor and outdoor environments.

As the layout method of disposing the fine convex or concave conductive members as the light diffusion reflection elements, any method can be used which allows the conductive members to be disposed randomly, such as using a random number table, the Fibonacci sequence, and the phase separation pattern realized by high polymer block copolymer and the like. It is preferable to use the phase separation pattern because the aperture factor for transmission display and reflection display can be controlled as desired.

In other words, according to the present invention, a desired aperture factor for transmission display and reflection display can be determined by using the method which not only can randomly dispose a plurality of convex or concave conductive members as the light diffusion reflection elements but also can determine the total area of the convex or concave members. A transflective liquid crystal display can therefore be provided which matches the illumination conditions.

Second Embodiment

Figure 7:
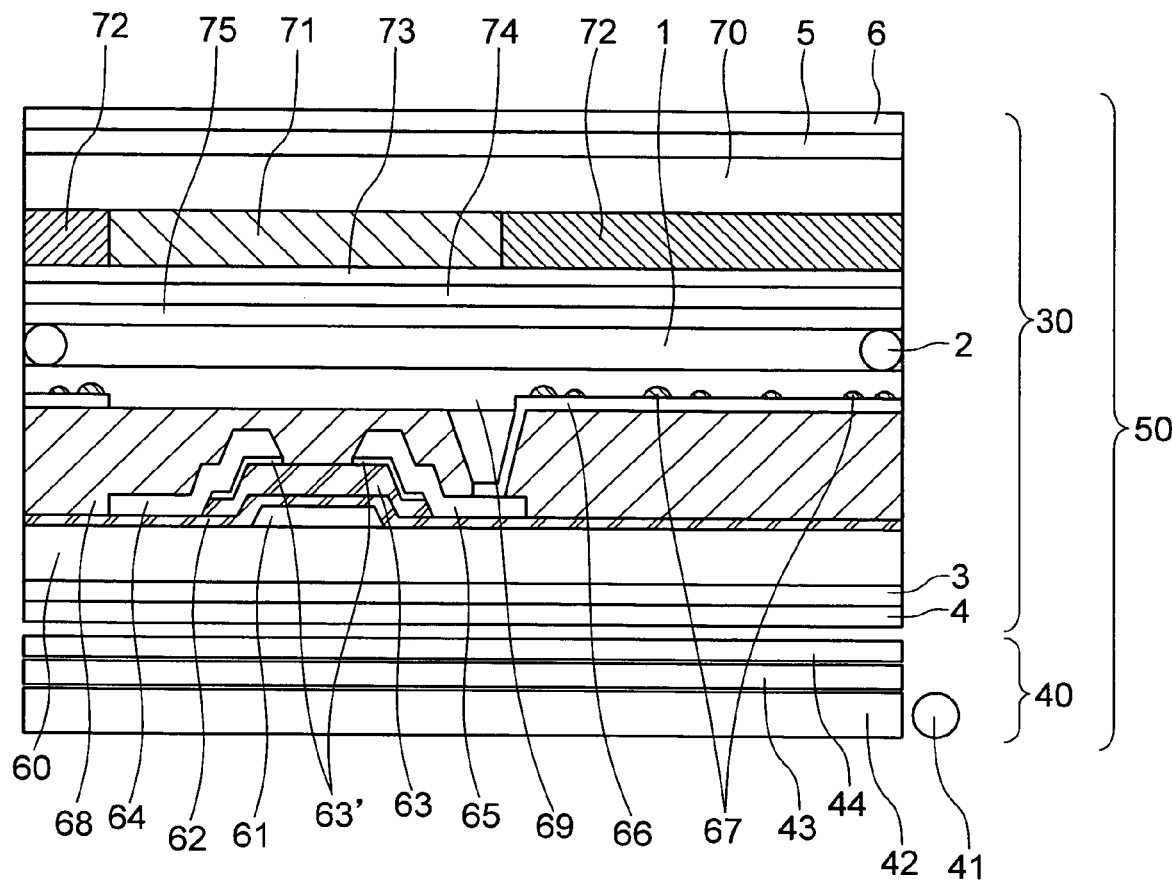
FIG. 7 is a diagram showing the cross sectional structure of another transflective type liquid crystal display of an active drive type according to an embodiment of the present invention.

Another embodiment of the present invention is shown in FIG. 7.

The different point of this embodiment from the first embodiment resides in that a pixel electrode 66 is electrically connected to the source electrode 65 of TFT via a contact hole formed through a protective film 68 disposed above TFT. In this embodiment, an orientation film 69 is disposed on the pixel electrode 66 or protective film 68.

The structure of the pixel electrode portion, the layout pattern of the conductive members and the structure of a transflective type liquid crystal display are the same as those of the first embodiment, and the detailed description thereof is omitted. This embodiment also has similar advantages to those of the first embodiment.

According to this embodiment, not only a liquid crystal display device can be manufactured by using current manufacture facilities and processes, but also a high quality image can be displayed both in transmission and reflection displays because an insulating film having a planarizing function is formed so that the thickness of the liquid crystal layer can be made generally equal in the reflection and transmission display areas. This embodiment is particularly effective for a transflective type liquid crystal display in a normally white mode. A transflective type liquid crystal display can be provided which can display a bright and high contrast image in any illumination environments.

Third Embodiment

Figure 8:
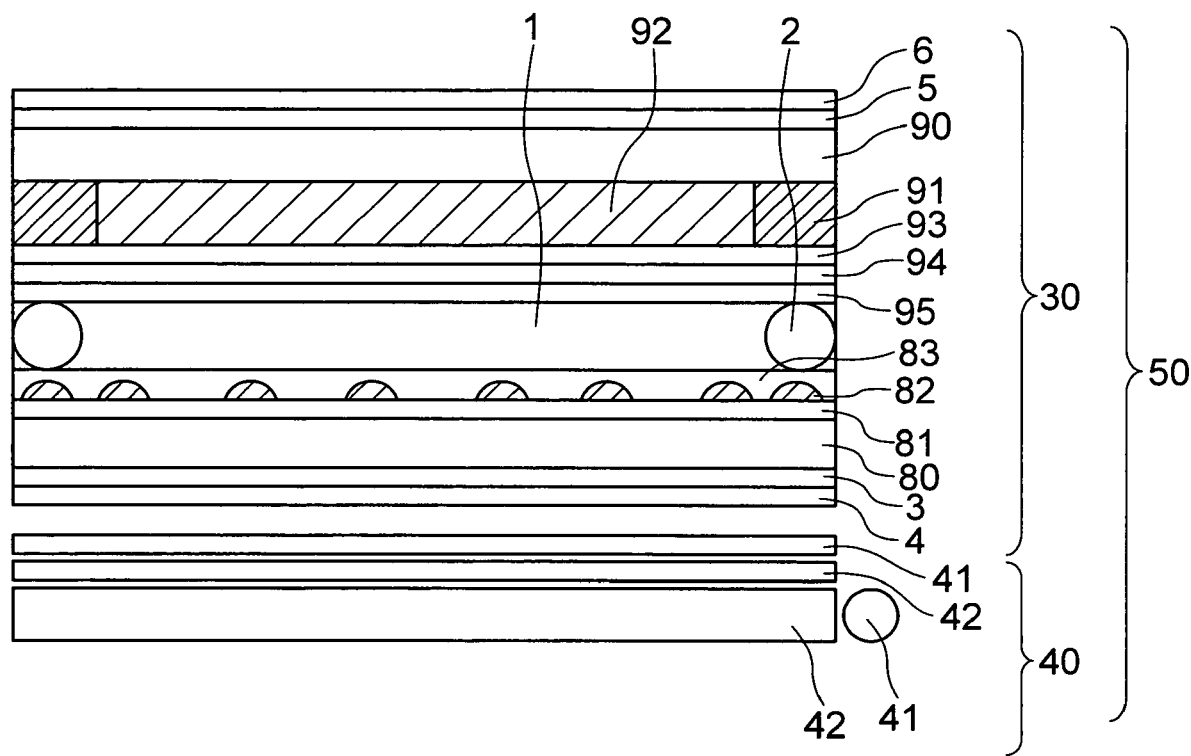
FIG. 8 is a diagram showing the cross sectional structure of a transflective type liquid crystal display of a passive drive type according to an embodiment of the present invention.

FIG. 8 shows a transflective liquid crystal display of a passive type having transflective electrodes each constituted of convex or concave conductive members having a reflection function disposed at a desired density on each pixel electrode made of a transparent conductive layer.

The display shown in FIG. 8 is a general transflective liquid crystal display of a passive type, excepting the following point. In FIG. 8, conductive members 82 are formed on and electrically connected to one transparent electrode 81. The material of the transparent electrode 81 is ITO having a film thickness of 100 to 300 nm, preferably 150 nm. The material of the conductive member is silver, a silver dust diameter is 1 to 10 μm, preferably 3 to 5 μm and a silver particle diameter is 1 to 20 nm, preferably 3 to 10 nm. Similar to the first embodiment, also in this embodiment, a TCP mounted with a liquid crystal driver IC, and an external driver circuit and the like are connected to a transflective type liquid crystal display device 30. A back light 40 constituted of a light source 41 (cold cathode tube, LED), a light guiding member 42 (material: acrylic), a prism sheet 43, a diffusion sheet 44 and the like is mounted on the transflective type liquid crystal display device 30, and this device is assembled in a housing such as a frame and a case to form a transflective type liquid crystal display 50.

Also this embodiment has similar advantages to those of the first embodiment, and the transflective type electrodes have a simple structure of only the conductive layer as the transparent electrode and the conductive members low in height as the reflection electrode. It is therefore possible not only to realize low cost because of a small number of constituent elements but also to display a high quality image because the transflective type liquid crystal display of a passive type can suppress a variation in liquid crystal layer thicknesses.

Fourth Embodiment

Figure 9:
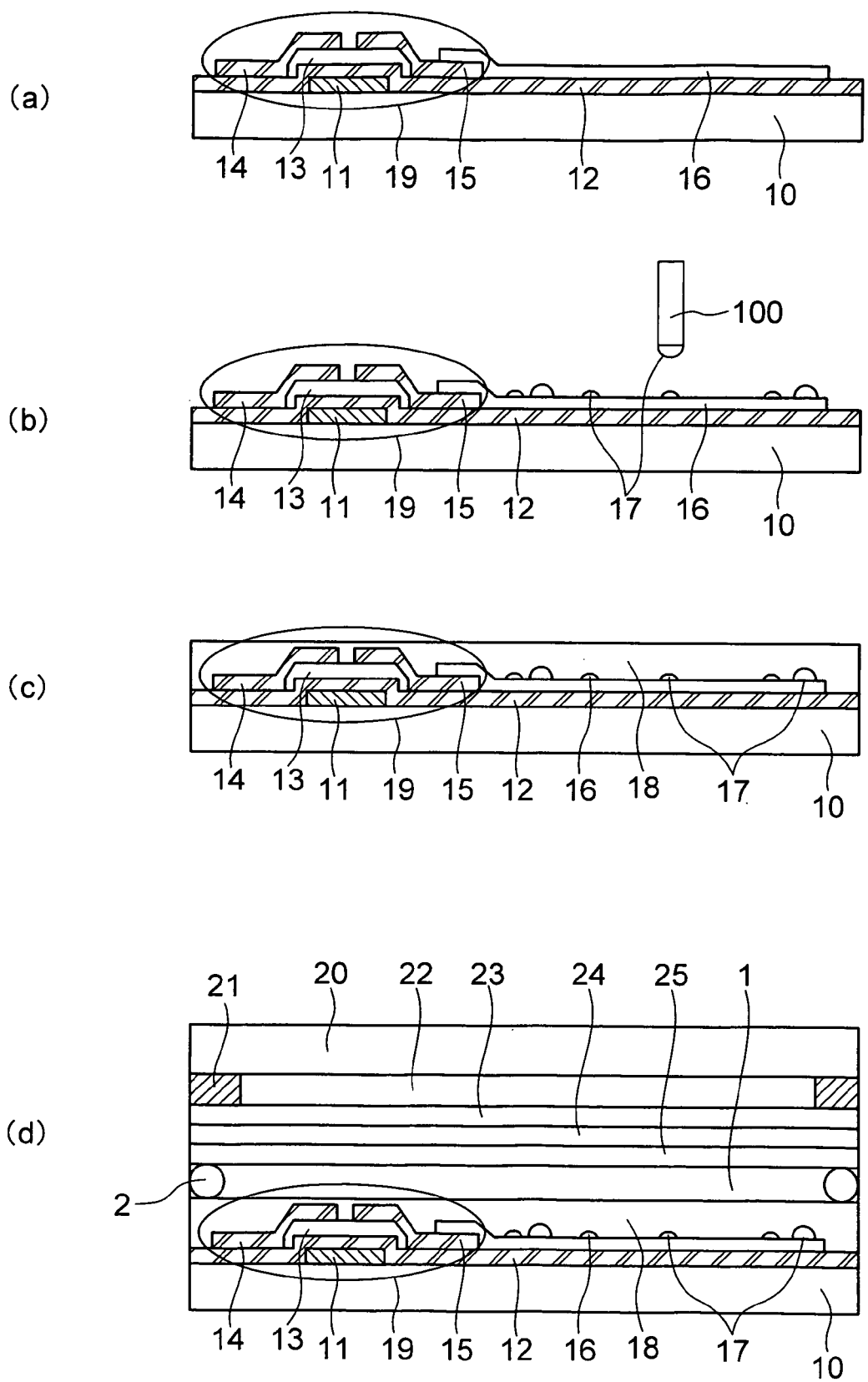
FIG. 9 is a diagram illustrating a manufacture method for a transflective type liquid crystal display of an active drive type according to an embodiment of the present invention.

FIG. 9 illustrates a manufacture method suitable for a transflective type liquid crystal display for a portable apparatus having electrodes for both transmission and reflection displays.

According to the manufacture method of the present invention, as shown in FIG. 9(*a*), a plurality of thin film transistors 19 are formed on a glass substrate 10 by vacuum vapor deposition and photolithography. The thin film transistor is constituted of a gate electrode 11, a gate insulating film 12, an amorphous layer 13, a drain electrode 14, a source electrode 15, and a transparent electrode 16 connected to the source electrode.

Next, as shown in FIG. 9(*b*), on the conductive layer 16, a plurality of electrically connected conductive members 17 for transflective type electrodes are directly formed without involving any insulating film by using a pattern forming apparatus of an ink jet type. The conductive member is made of silver dusts and silver particles (material: silver, silver dust diameter: 1 to 10 μm, preferably 3 to 5 μm, silver particle diameter: 1 to 20 nm, preferably 3 to 10 nm, binder: thermosetting resin, solvent: nonpolar solvent such as toluene and dodecane, viscosity: 1 to 10000 mPa·s, preferably 5 to 100 mPa·s, surface tension: 50 dyn/cm, preferably 25 dyn/cm, curing temperature: 150 to 250° C., preferably 180 to 220° C., resistivity: 1 to 50 μΩ·cm (film thickness: 0.01 to 10 μm), preferably 5 to 30 μΩ·cm), and has a fine convex or concave shape (shape: circle (diameter: 3 to 15 μm), height (or depth): 0.2 to 1 μm), a polygon, a bar or a string.

Next, as shown in FIG. 9(*c*), an orientation control film 18 (material: polyimide resin, coating method: spin coating, film thickness: 100 to 300 nm, preferably 150 nm) is formed above pixel electrodes 16 and conductive members 17 to thereby form one electrode substrate.

As shown in FIG. 9(*d*), another substrate is formed by forming on a glass substrate 20 (material: AN glass, plate thickness: 0.5 mm) a light shielding layer 21 (material: chromium and chromium oxide, film thickness: 100 to 300 nm, preferably 200 nm), a coloring layer 22 (base material: acrylic resin, dispersant: pigment, coating method: spin coating, film thickness: 1000 to 3000 nm, preferably 1500 nm), a protective layer 23 (material: acrylic resin, film thickness: 1000 to 3000 nm, preferably 2000 nm), a transparent electrode 24 (material: ITO (Indium Tin Oxide), film thickness: 100 to 300 nm, preferably 150 nm), and an orientation control film 25 (material: polyimide resin, coating method: spin coating, film thickness: 100 to 300 nm, preferably 200 nm).

The two electrode substrates are combined via spacer members 2 (materia: polymer beads, silica beads, glass fiber, particle diameter: 5 μm, dispersing method: water dispersion), with both the orientation control films 18, 25 being faced each other. The peripheral areas of both the electrode substrates 80 and 90 are bonded together by sealing material (not shown: material: epoxy resin, dispersant: spacer particles) and sealed. Liquid crystal is filled in the space between the electrode substrates 80 and 90 to thereby form a liquid crystal display device.

Although not shown, a predetermined phase difference plate and a predetermined polarizing plate are adhered to the glass substrates of the transflective liquid crystal device. A TCP mounted with a liquid crystal driver IC, and a driver external circuit and the like are connected to the transflective type liquid crystal display device. The liquid crystal display device and a back light are assembled in a housing such as a frame and a case to form a transflective type liquid crystal display, the back light being constituted of a light source (cold cathode tube, LED), a light guiding member (material: acrylic), a prism sheet, a diffusion sheet and the like. In this manner, a transflective type liquid crystal display is formed.

In this embodiment, fine convex conductive members as the diffusion reflection elements having the light reflection function are formed randomly on the transparent conductive layer by using a pattern forming apparatus or the like, the conductive members being used as the electrodes for both the transmission and reflection displays and electrically connected to the transparent conductive layer. A repulsive conductive material, on which a conductive material cannot be coated, may be coated on the transparent conductive layer in an area where the convex conductive members are not formed. With this manufacture method, the conductive members are disposed only in the area where the repulsive conductive material is not coated, by using a pattern forming apparatus or the like.

According to this embodiment, a loss of conductive members can be eliminated resulting in low cost.

Fifth Embodiment

Figure 10:
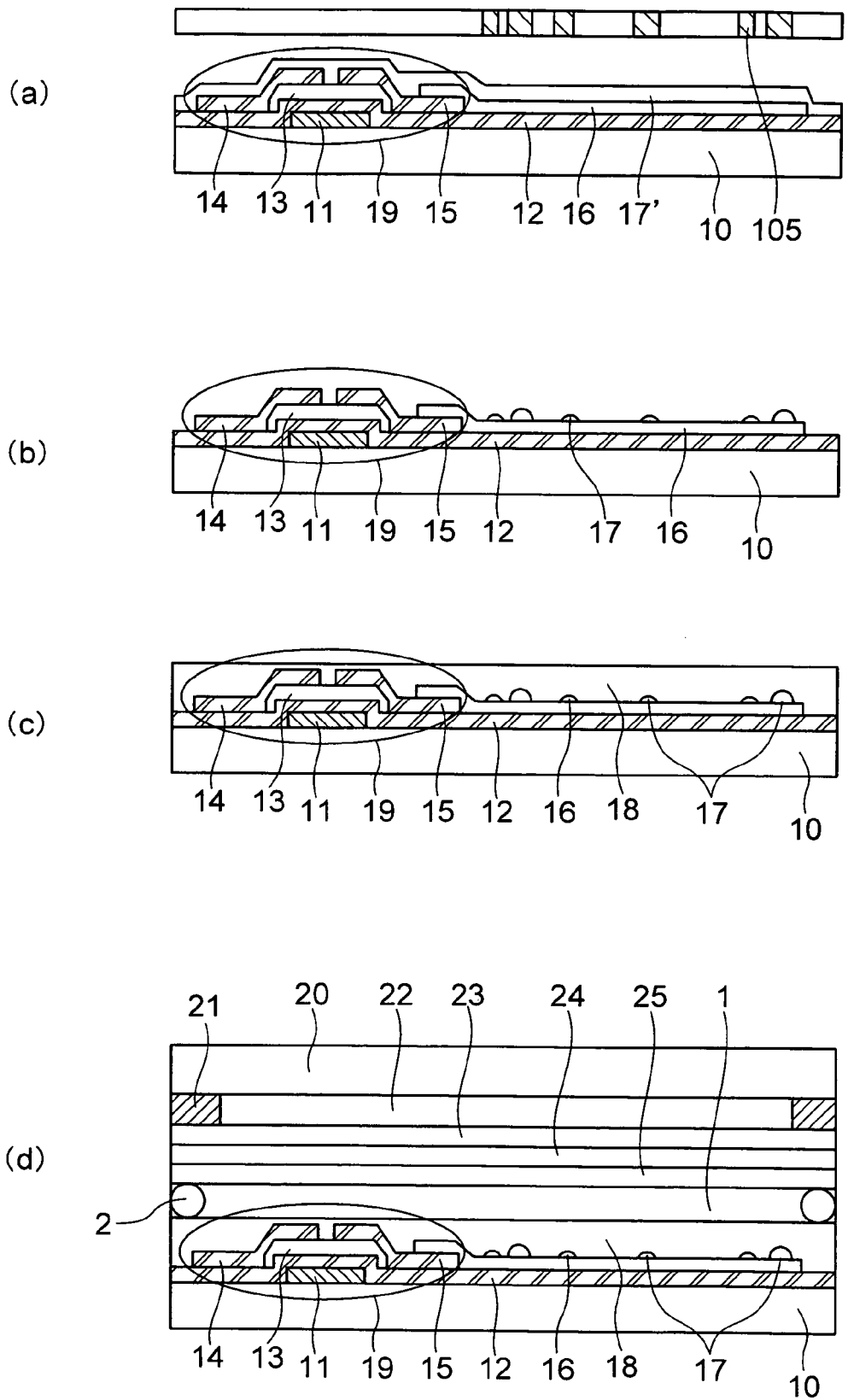
FIG. 10 is a diagram illustrating a manufacture method for a transflective type liquid crystal display of a passive drive type according to an embodiment of the present invention.

FIG. 10 illustrates another manufacture method suitable for a transflective type liquid crystal display for a portable apparatus having electrodes for both transmission and reflection displays.

Although description will be made by using as an example a transflective type liquid crystal display of an active type, the manufacture processes for both the transmission and reflection electrodes of a passive type are basically the same as those of the active type.

According to the manufacture method of the embodiment, as shown in FIG. 10(a), a plurality of thin film transistors 19 are formed on a glass substrate 10 (material: alkali-less glass, plate thickness: 0.5 mm) by general vacuum vapor deposition and photolithography. The thin film transistor is constituted of a gate electrode 11, a gate insulating film 12, an amorphous layer 13, a drain electrode 14, a source electrode 15, and a transparent electrode 16 connected to the source electrode.

On the electrode substrate, a conductive member thin film 17' is formed. The conductive member is made of silver dusts and silver particles (material: silver, silver dust diameter: 1 to 10 µm, preferably 3 to 5 µm, silver particle diameter: 1 to 20 nm, preferably 3 to 10 nm, binder: positive type photosensitive resin, solvent: nonpolar solvent such as toluene and dodecane, viscosity: 1 to 10000 mPa·s, preferably 5 to 100 mPa·s, surface tension: 50 dyn/cm, preferably 25 dyn/cm, curing temperature: 150 to 250° C., preferably 180 to 220° C., resistivity: 1 to 50 µΩ·cm (film thickness: 0.01 to 10 µm), preferably 5 to 30 µΩ·cm).

Next, ultraviolet rays are exposed to the conductive member thin film 17' via a photo mask 15 and it is developed, under the predetermined conditions.

Next, as shown in FIG. 10(b), conductive members 17' formed on the pixel electrode 16 are cured under the predetermined conditions to form a plurality of electrically connected fine convex or concave conductive members 17 (shape: circle (diameter: 3 to 15 µm), height (or depth): 0.2 to 1 µm), a polygon, a bar or a string, reflection display area), directly on the conductive layer without involving any insulating film, to thereby form transflective type electrodes using the area other than the reflection display area as a transmission display area.

Next, as shown in FIG. 10(c), an orientation control film 18 (material: polyimide resin, coating method: spin coating, film thickness: 100 to 300 nm, preferably 150 nm) is formed above pixel electrodes 16 and conductive members 17 to thereby form one electrode substrate.

As shown in FIG. 10(d), another electrode substrate is formed by forming on a glass substrate 20 (material: alkali-less glass, plate thickness: 0.5 mm) a light shielding layer 21 (material: chromium and chromium oxide, film thickness: 100 to 300 nm, preferably 200 nm, or base material: acrylic resin, dispersant: black pigment, coating method: spin coating, film thickness: 1000 to 3000 nm, preferably 1500 nm), a coloring layer 22 (base material: acrylic resin, dispersant: pigment, coating method: spin coating, film thickness: 1000 to 3000 nm, preferably 1500 nm), a protective layer 23 (material: acrylic resin, film thickness: 1000 to 3000 nm, preferably 2000 nm), a transparent electrode 24 (material: ITO (Indium Tin Oxide), film thickness: 100 to 300 nm, preferably 150 nm), and an orientation control film 25 (material: polyimide resin, coating method: spin coating, film thickness: 100 to 300 nm, preferably 200 nm).

The two electrode substrates are combined via spacer members 2 (materia: polymer beads, silica beads, glass fiber, particle diameter: 5 µm, dispersing method: water dispersion), with both the orientation control films 83, 95 being faced each other. The peripheral areas of both the electrode substrates 10 and 20 are bonded together by sealing material (not shown: material: epoxy resin, dispersant: spacer particles) and sealed. Liquid crystal is filled in the space between the electrode substrates 10 and 20 to thereby form a liquid crystal display device.

Although not shown, a predetermined phase difference plate and a predetermined polarizing plate are adhered to the glass substrates of the transflective liquid crystal device. A TCP mounted with a liquid crystal driver IC, and a driver external circuit and the like are connected to the transflective type liquid crystal display device. The liquid crystal display device and a back light are assembled in a housing such as a frame and a case to form a transflective type liquid crystal display, the back light being constituted of a light source (cold cathode tube, LED), a light guiding member (material: acrylic), a prism sheet, a diffusion sheet and the like. In this manner, a transflective type liquid crystal display is formed.

This embodiment also has the advantages similar to those of the first embodiment. In addition, since the photosensitive conductive material is used for forming electrodes for reflection display, current manufacture facilities and processes can be used without any facility investment.

Sixth Embodiment

Figure 11:
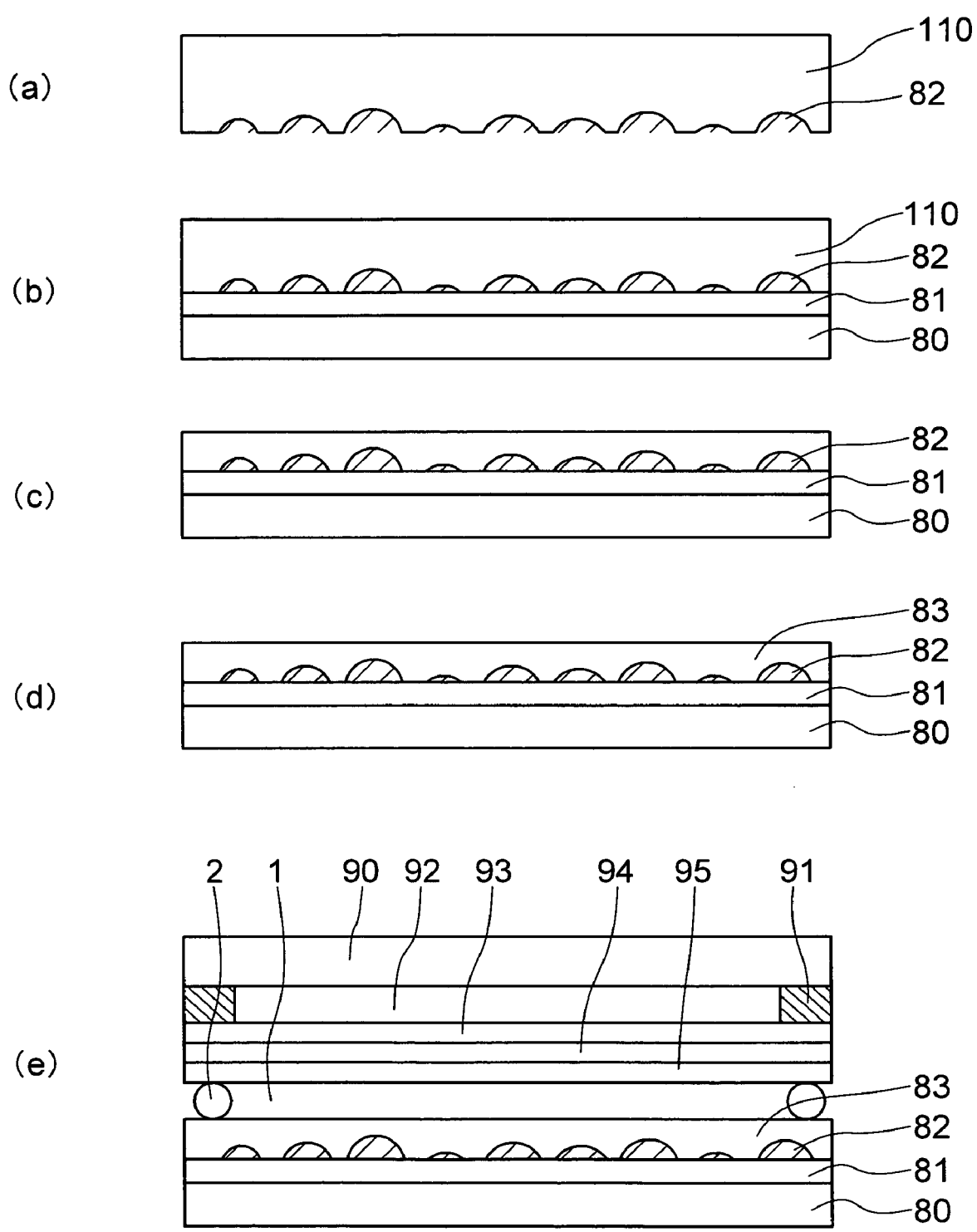
FIG. 11 is a diagram illustrating another manufacture method for a transflective type liquid crystal display of a passive drive type according to an embodiment of the present invention.

FIG. 11 illustrates another manufacture method suitable for a transflective type liquid crystal display for a portable apparatus having electrodes for both transmission and reflection displays.

Although description will be made by using as an example a transflective type liquid crystal display of an active type, the manufacture processes for both the transmission and reflection electrodes of a passive type are basically the same as those of the active type.

According to the manufacture method of the present invention, a pattern forming apparatus has a transfer mold 110 having a desired fine concave shape (shape: circle (diameter: 3 to 15 µm, height (or depth): 0.2 to 1 µm), polygon, bar or string) and provided with a peel-off function after a surface silicon coating process, as shown in FIG. 11(a), and conductive members 82 filled in the concave portions of the transfer mold. The conductive member is made of silver dusts and silver particles (material: silver, silver dust diameter: 1 to 10 µm, preferably 3 to 5 µm, silver particle diameter: 1 to 20 nm, preferably 3 to 10 nm, binder: thermosetting resin, solvent: nonpolar solvent such as toluene and dodecane, viscosity: 1 to 10000 mPa·s, preferably 5 to 100 mPa·s, surface tension: 50 dyn/cm, preferably 25 dyn/cm, curing temperature: 150 to 250° C., preferably 180 to 220° C., resistivity: 1 to 50 µΩ·cm (film thickness: 0.01 to 10 µm), preferably 5 to 30 µΩ·cm). As shown in FIG. 11(b), an electrode substrate having a transparent electrode 81 stacked on a glass substrate 80 (material: soda glass, plate thickness: 0.5 mm) is position-aligned with the pattern forming apparatus 100. As shown in FIG. 11(c), on the transparent electrode 81 stacked on the glass substrate 80 (materia: soda glass, plate thickness: 0.5 mm), a plurality of electrically connected conductive members 82 having the reflection function for the electrode for the transflective type are directly formed without involving any insulating film. The conductive member has a fine convex or concave shape (shape: circle (diameter: 3 to 15 µm, height (or depth): 0.2 to 1 µm), polygon, bar or string). As shown in FIG. 11(d), an orientation control film 18 (material: polyimide resin, coating method: spin coating, film thickness: 100 to 300 nm, preferably 150 nm) is formed above the transparent electrode or conductive members to form one electrode substrate. As shown in FIG. 11(e), another substrate is formed by forming on a glass substrate 90 (material: soda glass, plate thickness: 0.5 mm) a light shielding layer 91 (material: chromium and chromium oxide, film thickness: 100 to 300 nm, preferably 200 nm, or base material: acrylic resin, dispersant: black pigment, coating method: spin coating, film thickness: 1000 to 3000, preferably 1500 nm), a coloring layer 92 (base material: acrylic resin, dispersant: pigment, coating method: spin coating, film thickness: 1000 to 3000 nm, preferably 1500 nm), a protective layer 93 (material: acrylic resin, film thickness: 1000 to 3000 nm, preferably 2000 nm), a transparent electrode 94 (material: ITO (Indium Tin Oxide), film thickness: 100 to 300 nm, preferably 150 nm), and an orientation control film 95 (material: polyimide resin, coating method: spin coating, film thickness: 100 to 300 nm, preferably 200 nm). The two electrode substrates are combined via spacer members 2 (materia: polymer beads, silica beads, glass fiber, particle diameter: 5 μm, dispersing method: water dispersion), with both the orientation control films 83, 95 being faced each other. The peripheral areas of both the electrode substrates 80 and 90 are bonded together by sealing material (not shown: material: epoxy resin, dispersant: spacer particles) and sealed. Liquid crystal 1 is filled in the space between the electrode substrates 80 and 90 to thereby form a liquid crystal display device. Although not shown, a predetermined phase difference plate and a predetermined polarizing plate are adhered to the glass substrates of the transflective liquid crystal device. A TCP mounted with a liquid crystal driver IC, and a driver external circuit and the like are connected to the transflective type liquid crystal display device. The liquid crystal display device and a back light are assembled in a housing such as a frame and a case to form a transflective type liquid crystal display, the back light being constituted of a light source (cold cathode tube, LED), a light guiding member (material: acrylic), a prism sheet, a diffusion sheet and the like. In this manner, a transflective type liquid crystal display is formed.

In this embodiment, although the flat plate transfer mold is used for forming reflection electrodes made of the conductive members, the present invention is not limited thereto, but a roll shape transfer mold may be used with similar advantages.

The embodiment has similar advantages to those of the fourth embodiment. In addition, since the reflection electrodes of the conductive members are formed beforehand on the flat plate transfer mold subjected to a three-dimensional work, the transflective type electrodes can be formed only by the process of transferring the conductive members to the conductive layer as the transparent electrode, and the conductive material of the reflection electrodes can be used without any loss.

Seventh Embodiment

Figure 12:
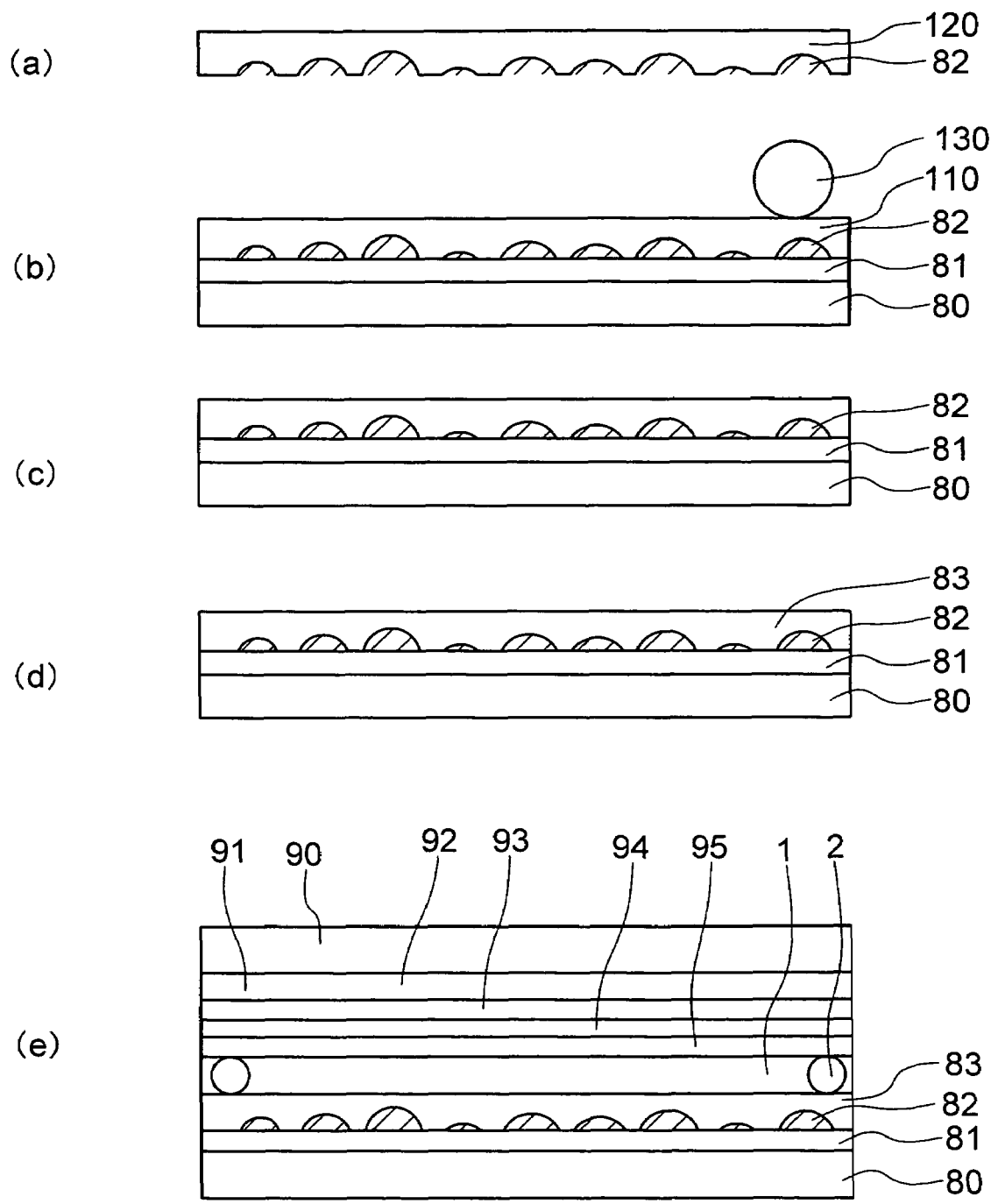
FIG. 12 is a diagram illustrating still another manufacture method for a transflective type liquid crystal display of a passive drive type according to an embodiment of the present invention.

FIG. 12 illustrates another manufacture method suitable for a transflective type liquid crystal display for a portable apparatus having electrodes for both transmission and reflection displays.

Although description will be made by using as an example a transflective type liquid crystal display of an active type, the manufacture processes for both the transmission and reflection electrodes of a passive type are basically the same as those of the active type.

According to the manufacture method of the present invention, a pattern forming apparatus 120 has a sheet type transfer mold having a desired fine concave shape (shape: circle (diameter: 3 to 15 μm, height (or depth): 0.2 to 1 μm), polygon, bar or string) as shown in FIG. 12(a), and conductive members 82 filled in the concave portions of the sheet type transfer mold of the pattern forming apparatus. The conductive member is made of silver dusts and silver particles (material: silver, silver dust diameter: 1 to 10 μm, preferably 3 to 5 μm, silver particle diameter: 1 to 20 nm, preferably 3 to 10 nm, binder: thermosetting resin, solvent: nonpolar solvent such as toluene and dodecane, viscosity: 1 to 10000 mPa·s, preferably 5 to 100 mPa·s, surface tension: 50 dyn/cm, preferably 25 dyn/cm, curing temperature: 150 to 250° C., preferably 180 to 220° C., resistivity: 1 to 50 μΩ·cm (film thickness: 0.01 to 10 μm), preferably 5 to 30 μΩ·cm). As shown in FIG. 12(b), an electrode substrate having a transparent electrode 81 stacked on a glass substrate 80 is position-aligned with the pattern forming apparatus 120. As shown in FIG. 12(c), on the transparent electrode 81 stacked on the glass substrate 80 (materia: soda glass, plate thickness: 0.5 mm), a plurality of electrically connected conductive members 82 having the reflection function for the electrodes for the transflective type are directly formed without involving any insulating film. The conductive member has a fine convex or concave shape (shape: circle (diameter: 3 to 15 μm, height (or depth): 0.2 to 1 μm), polygon, bar or string). As shown in FIG. 12(d), an orientation control film 83 (material: polyimide resin, coating method: spin coating, film thickness: 100 to 300 nm, preferably 150 nm) is formed above the transparent electrode or conductive members to form one electrode substrate. As shown in FIG. 12(e), another substrate is formed by forming on a glass substrate 90 (material: soda glass, plate thickness: 0.5 mm) a light shielding layer 91 (material: chromium and chromium oxide, film thickness: 100 to 300 nm, preferably 200 nm, or base material: acrylic resin, dispersant: black pigment, coating method: spin coating, film thickness: 1000 to 3000 nm, preferably 1500 nm), a coloring layer 92 (base material: acrylic resin, dispersant: pigment, coating method: spin coating, film thickness: 1000 to 3000 nm, preferably 1500 nm), a protective layer 93 (material: acrylic resin, film thickness: 1000 to 3000 nm, preferably 2000 nm), a transparent electrode 94 (material: ITO (Indium Tin Oxide), film thickness: 100 to 300 nm, preferably 150 nm), and an orientation control film 95 (material: polyimide resin, coating method: spin coating, film thickness: 100 to 300 nm, preferably 200 nm). The two electrode substrates are combined via spacer members 2 (materia: polymer beads, silica beads, glass fiber, particle diameter: 5 μm, dispersing method: water dispersion), with both the orientation control films 83, 95 being faced each other. The peripheral areas of both the electrode substrates 80 and 90 are bonded together by sealing material (not shown: material: epoxy resin, dispersant: spacer particles) and sealed. Liquid crystal 1 is filled in the space between the electrode substrates 80 and 90 to thereby form a liquid crystal display device. Although not shown, a predetermined phase difference plate and a predetermined polarizing plate are adhered to the glass substrates of the transflective liquid crystal device. A TCP mounted with a liquid crystal driver IC, and a driver external circuit and the like are connected to the transflective type liquid crystal display device. The liquid crystal display device and a back light are assembled in a housing such as a frame and a case to form a transflective type liquid crystal display, the back light being constituted of a light source (cold cathode tube, LED), a light guiding member (material: acrylic), a prism sheet, a diffusion sheet and the like. In this manner, a transflective type liquid crystal display is formed.

In this embodiment, although the sheet type high polymer film is used for forming reflection electrodes made of the conductive members, the present invention is not limited thereto, but an elongated high polymer film having a three-dimensional shape wound in a roll may be used with similar advantages.

The embodiment has similar advantages to those of the fourth embodiment. In addition, the reflection electrodes of the conductive members are formed through transfer to the transparent electrode, by using a high polymer film provided with conductive members having a three-dimensional shape suitable for transmission and reflection electrodes. Therefore, the shape allowing the better diffusion reflection characteristics to be realized can be transferred to the conductive members at high precision.

INDUSTRIAL APPLICABILITY

As described so far, the present invention is effective for providing a liquid crystal display with transflective electrodes having better transmission and reflection characteristics, and its manufacture method.

The invention claimed is:

1. A transflective type liquid crystal display comprising a liquid crystal layer squeezed between a pair of substrates; a transmission display portion and a reflection display portion, said display portion comprising:
    a plurality of pixels formed on one of said substrates in an area surrounded by a plurality of gate electrodes and a plurality of source electrodes arranged orthogonal to said gate electrodes;
    a thin-film transistor arranged in each pixel and disposed near an intersection between each gate electrode and each source electrode; and
    a pixel electrode connected to said thin-film transistor, wherein said pixel electrode comprises a transparent conductive layer and conductive members having a light reflection function and electrically connected to said transparent conductive layer, and said conductive members are disposed on the surface of said transparent and conductive layer randomly and dispersively.

2. A transflective type liquid crystal display according to claim 1, wherein said conductive members are directly disposed on said transparent conductive layer.

3. A transflective type liquid crystal display according to claim 1, wherein in each pixel area, said reflection display portion is an area where said conductive members are disposed, and said transmission portion is an area other than said reflection display portion.

4. A transflective type liquid crystal display according to claim 1, wherein said conductive members comprise a plurality of convex or concave members;
    and each of said convex or concave members has a continuously changing slope surface.

5. A transflective type liquid crystal display according to claim 1, wherein a pattern where said conductive members are arranged on the surface of said transparent conductive layer is such that a plurality of conductive members formed of convex or concave members are disposed dispersively, each of said conductive members having generally a circle, polygon, bar or string shape.

6. A transflective type liquid crystal display according to claim 5, wherein a pattern of said circles, polygons, bars and strings is a phase separation pattern realized by high polymer block copolymer.

7. A transflective type liquid crystal display according to claim 1, wherein said conductive members are dispersively disposed on all area of a specified area of said transparent conductive layer.

8. A transflective type liquid crystal display according to claim 1, wherein a common electrode is disposed on the other of said pair of substrates.

9. A transflective type liquid crystal display performing transmission type display and reflection type display in each pixel, wherein:
    a pixel electrode disposed in each pixel is constituted of a transparent conductive layer and conductive members having a light reflection function and electrically connected to said transparent conductive layer;
    said conductive members comprise a plurality of-convex or concave members;
    said conductive members are directly disposed on said transparent conductive layer; and
    said convex or concave members are made of conductive material mainly consisting of fine particles of silver or gold having a nano order diameter.

10. A transflective type liquid crystal display performing transmission type display and reflection type display in each pixel, wherein:
    a pixel electrode disposed in each pixel comprises a flat plate type transparent conductive layer and conductive members having a light reflection function;
    said conductive members comprise a plurality of convex or concave members;
    said conductive members are directly disposed on said transparent conductive layer; and
    said convex or concave members are made of conductive material mainly consisting of fine particles of silver or gold having a nano order diameter.

* * * * *